US011933082B2

(12) United States Patent
Strole et al.

(10) Patent No.: US 11,933,082 B2
(45) Date of Patent: Mar. 19, 2024

(54) CINCHING LATCH ASSEMBLY

(71) Applicant: STRATTEC SECURITY CORPORATION, Milwaukee, WI (US)

(72) Inventors: Michael Strole, Royal Oak, MI (US); Ian Martin, Waterford, MI (US)

(73) Assignee: STRATTEC SECURITY CORPORATION, Milwaukee, WI (US)

( * ) Notice: Subject to any disclaimer, the term of this patent is extended or adjusted under 35 U.S.C. 154(b) by 295 days.

(21) Appl. No.: 17/208,041

(22) Filed: Mar. 22, 2021

(65) Prior Publication Data

US 2021/0293059 A1 Sep. 23, 2021

Related U.S. Application Data

(60) Provisional application No. 62/993,467, filed on Mar. 23, 2020.

(51) Int. Cl.
*E05B 81/20* (2014.01)
*E05B 83/18* (2014.01)

(52) U.S. Cl.
CPC .............. *E05B 81/20* (2013.01); *E05B 83/18* (2013.01); *E05Y 2900/531* (2013.01); *E05Y 2900/548* (2013.01)

(58) Field of Classification Search
CPC .......... E05B 81/18; E05B 81/20; E05B 83/16; E05B 83/18; E05B 83/24; E05B 85/20; E05B 85/24; E05B 85/243; E05B 85/26
See application file for complete search history.

(56) References Cited

U.S. PATENT DOCUMENTS

| | | | |
|---|---|---|---|
| 3,565,476 | A | 2/1971 | Berman |
| 3,572,793 | A | 3/1971 | Cole |
| 3,905,624 | A | 9/1975 | Fujita |

(Continued)

FOREIGN PATENT DOCUMENTS

| | | | |
|---|---|---|---|
| CN | 103590675 | A | 2/2014 |
| DE | 102007003292 | A1 | 7/2008 |

(Continued)

OTHER PUBLICATIONS

English Translation for KR 20170119013 A, Generated on Mar. 8, 2023, https://worldwide.espacenet.com/ (Year: 2022).*

*Primary Examiner* — Alyson M Merlino
(74) *Attorney, Agent, or Firm* — Michael Best & Friedrich LLP

(57) ABSTRACT

A cinching latch assembly for latching a striker includes a forkbolt biased to rotate about a first pivot point between a primary latched position, a secondary latched position, and a fully released position. The cinching latch assembly also includes a detent biased to rotate about a second pivot point to engage with the forkbolt in at least one position of the forkbolt, and a lift lever biased to rotate about a third pivot point, the lift lever having a first end to lift up on the striker during at least one position of the striker within the latch assembly. The cinching latch assembly also includes a cinch lever that, during a powered cinching operation, lowers the lift lever away from the striker prior to the forkbolt moving from the fully released position to the secondary latched position.

19 Claims, 6 Drawing Sheets

(56) References Cited

U.S. PATENT DOCUMENTS 4,961,601 A * 10/1990 Lindholm ............... E05B 83/16 292/216
4,991,884 A 2/1991 Cairns
5,000,493 A 3/1991 Bastien
5,150,933 A * 9/1992 Myslicki ................. E05B 83/16 292/216
5,348,355 A 9/1994 Oyha
5,738,393 A 4/1998 Chao
5,853,060 A 12/1998 Chao et al.
6,050,117 A 4/2000 Weyerstall
6,070,921 A 6/2000 Valasin
6,361,091 B1 3/2002 Weschler
6,371,536 B1 4/2002 Koerwer et al.
6,435,573 B1 8/2002 Szablewski
6,459,223 B2 10/2002 Mauel et al.
6,581,987 B1 6/2003 Gentile et al.
6,588,828 B2 7/2003 Fisher
6,648,379 B1 11/2003 Kordowski et al.
6,666,483 B2 12/2003 Baniak et al.
6,742,819 B2 6/2004 So et al.
6,860,356 B2 3/2005 Peter
7,163,256 B2 1/2007 Haunstetter
7,195,090 B2 3/2007 Parks et al.
7,331,616 B2 2/2008 Brei et al.
8,284,022 B2 10/2012 Kachouh
8,419,114 B2 4/2013 Fannon et al.
8,505,987 B2 8/2013 Browne et al.
8,534,720 B2 9/2013 Meyer et al.
8,573,658 B2 11/2013 Kim
8,579,068 B2 11/2013 Farooq et al.
8,764,075 B2 7/2014 Taurasi et al.
8,935,053 B2 1/2015 Wheeler et al.
9,091,102 B2 7/2015 Krishnan
9,120,461 B2 9/2015 Farooq et al.
9,145,716 B2 9/2015 Jayasuriya et al.
9,163,435 B2 10/2015 Zysk et al.
9,187,936 B2 11/2015 Kim et al.
9,194,163 B2 11/2015 Margheritti et al.
9,255,429 B2 2/2016 Kim et al.
9,382,731 B2 7/2016 Kim et al.
9,777,516 B2 10/2017 Farooq et al.
10,577,842 B2 3/2020 Farris et al.
10,584,520 B2 3/2020 Scholz et al.
10,590,683 B2 3/2020 Cumbo
11,015,375 B2 * 5/2021 Lebsak ................... E05B 85/26
11,414,900 B2 * 8/2022 Sturm ..................... E05B 81/20
11,572,721 B2 2/2023 Strole et al.
2006/0170224 A1 8/2006 Mitchell et al.
2010/0237632 A1 9/2010 Browne et al.
2012/0161456 A1 6/2012 Riedmayr et al.
2012/0313384 A1 12/2012 Cumbo et al.
2013/0049403 A1 2/2013 Fannon et al.
2014/0246870 A1 9/2014 Kim et al.
2014/0319848 A1 10/2014 Fannon
2014/0361554 A1 12/2014 Ferri et al.
2015/0054293 A1 * 2/2015 Kim ........................ E05B 81/08 292/92
2015/0076840 A1 3/2015 Schoch et al.
2015/0345185 A1 12/2015 Farooq et al.
2015/0345186 A1 12/2015 Park
2016/0032626 A1 2/2016 Margheritti et al.
2016/0076279 A1 3/2016 Ilea et al.
2017/0096845 A1 4/2017 Bendel
2017/0138098 A1 5/2017 Covarrubias Pazaran
2017/0191291 A1 7/2017 Scholz et al.
2017/0241169 A1 8/2017 Rao et al.
2018/0073283 A1 * 3/2018 Kim ........................ E05B 81/20
2019/0145135 A1 5/2019 Lebsak et al.
2019/0226247 A1 * 7/2019 Johann .................... E05B 81/20
2020/0071971 A1 3/2020 Cho et al.

FOREIGN PATENT DOCUMENTS

DE 102007003293 A1 7/2008
DE 102007005444 A1 8/2008
DE 102007007633 A1 8/2008
DE 102007008700 A1 8/2008
DE 102009034904 A1 2/2011
DE 102010062700 A1 6/2012
DE 102019110702 A1 10/2020
KR 20170043831 A 4/2017
KR 20170119013 A * 10/2017

* cited by examiner

CINCHING LATCH ASSEMBLY

CROSS-REFERENCE TO RELATED APPLICATIONS

This application claims priority to U.S. Provisional Application No. 62/993,467, filed Mar. 23, 2020, the entire contents of which are incorporated herein by reference.

FIELD

The present disclosure relates to latch assemblies, and more specifically to cinching latch assemblies for motor vehicles.

BACKGROUND

Many current motor vehicles include compartments (e.g., hoods, trunks, frunks, etc.) that are latched with latch assemblies. A frunk is a trunk located at a front, rather than a rear, of a vehicle. The latch assemblies enable an operator to push down on the compartment, or for a power closure mechanism to lower the compartment, and for the compartment to be cinched and latched in place.

SUMMARY

In accordance with one embodiment, a cinching latch assembly for latching a striker includes a forkbolt biased to rotate about a first pivot point between a primary latched position, a secondary latched position, and a fully released position. The cinching latch assembly also includes a detent biased to rotate about a second pivot point to engage with the forkbolt in at least one position of the forkbolt, and a lift lever biased to rotate about a third pivot point, the lift lever having a first end to lift up on the striker during at least one position of the striker within the latch assembly. The cinching latch assembly also includes a cinch lever that, during a powered cinching operation, lowers the lift lever away from the striker prior to the forkbolt moving from the fully released position to the secondary latched position.

In accordance with another embodiment, a cinching latch assembly for latching a striker includes a forkbolt biased to rotate between a primary latched position, a secondary latched position, and a fully released position. The cinching latch assembly also includes a lift lever having a first end to lift up on the striker during at least one position of the striker within the latch assembly. The lift lever additionally includes a second, opposite end, and a pivot point disposed between the first end and the second end. During operation, the first end of the lift lever is raised such that the striker is pressed upwardly by the first end of the lift lever at a location above a location of the striker in the secondary latched position.

In accordance with another embodiment, a method of operating a cinching latch assembly includes rotating a cinch lever until a surface of the cinch lever contacts a latch lever pin on a second end of a lift lever. The lever is configured to pivot about a pivot point. The method also includes rotating the cinch lever further such that the latch lever pin is raised, forcing the lift lever to rotate about the pivot point, and forcing a first end of the lift lever to be lowered away from a striker.

Other embodiments and aspects of various embodiments will become apparent by consideration of the detailed description and accompanying drawings.

Before any embodiments are explained in detail, it is to be understood that embodiments are not limited in their application to the details of construction and the arrangement of components set forth in the following description or illustrated in the following drawings. Other embodiments are possible and embodiments described and illustrated are capable of being practiced or of being carried out in various ways.

DETAILED DESCRIPTION

FIGS. 1-6 illustrate a cinching latch assembly 10. The cinching latch assembly 10 may be used on any of a variety of common motor vehicles (e.g., sedan, SUV, minivan, truck, etc.), or may be used with other types of machines or vehicles, and in any locations on a machine or vehicle where the cinching latch assembly 10 may be beneficial to control operation and cinching/latching of a compartment.

With continued reference to FIGS. 1-6, the cinching latch assembly 10 includes a frameplate 14. The frameplate 14 defines an elongate fishmouth (i.e., slot) 18 that is sized and shaped to receive a striker 22. The frameplate 14 may have shapes and sizes other than that illustrated. In some embodiments, the frameplate 14 is coupled (e.g., fixed) directly to an interior of a motor vehicle, adjacent a compartment of the motor vehicle. In some embodiments, the frameplate 14 is partially or entirely surrounded by a housing (not shown).

Figure 1A:
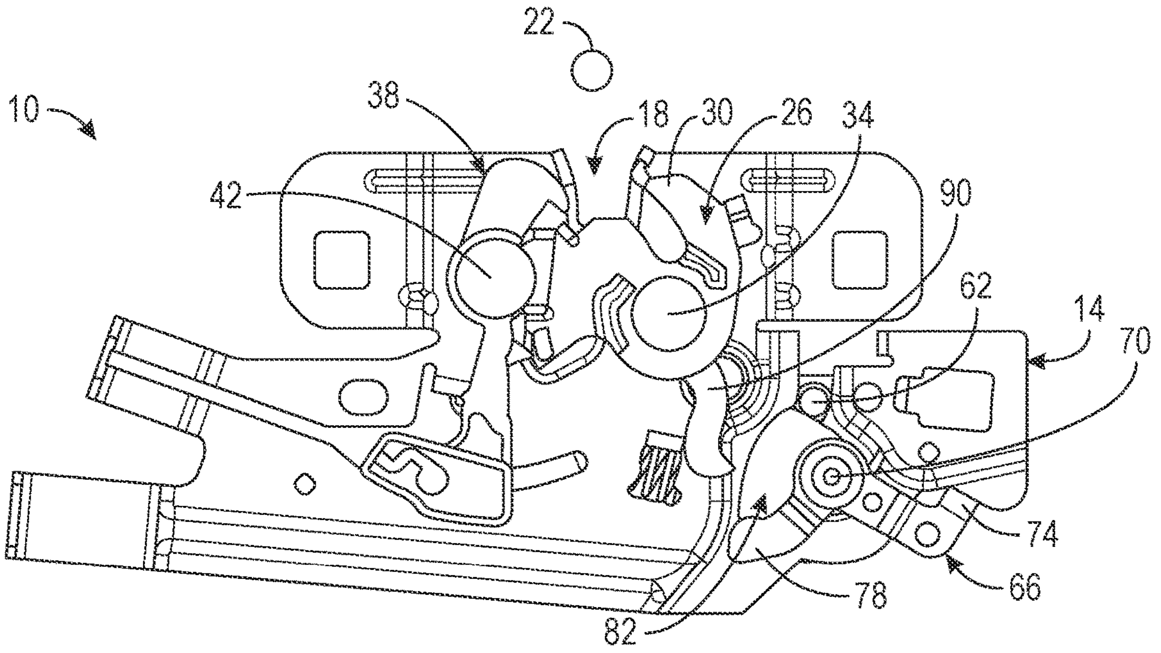
FIGS. 1A and 1B are front and rear views, respectively, of a cinching latch assembly according to one embodiment, illustrating the cinching latch assembly in a fully released, pop-up position.
Figure 2A:
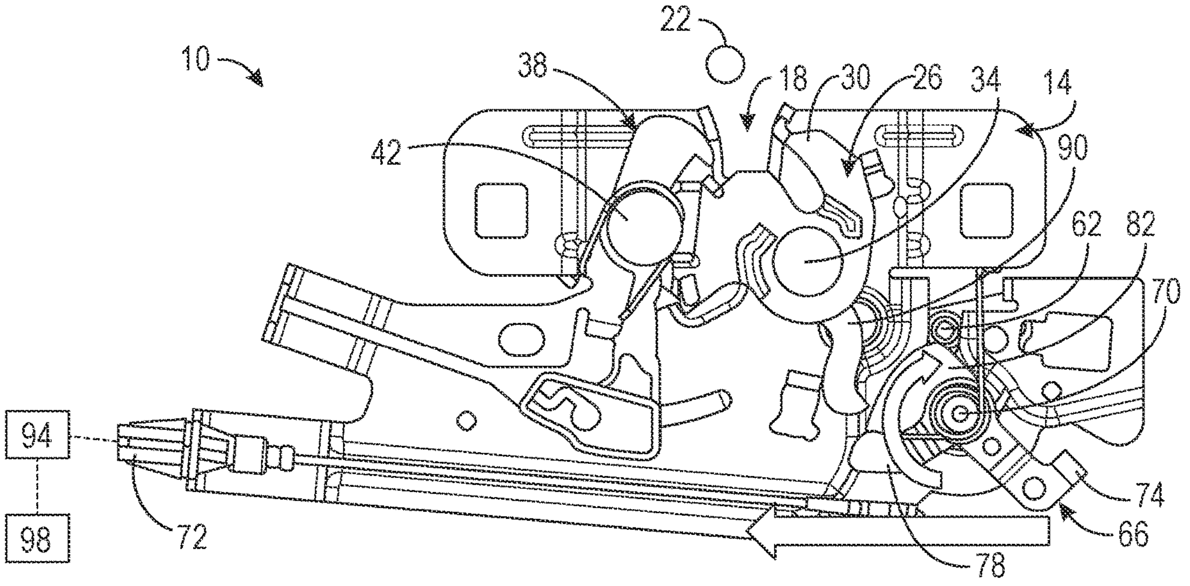
FIGS. 2A and 2B are front and rear views, respectively, of the cinching latch assembly, illustrating powered movement and lowering of an end of a lift lever.

The cinching latch assembly 10 further includes a forkbolt (i.e., ratchet or catch) 26 disposed at least partially within the frameplate 14. The forkbolt 26 includes a hook portion 30. The forkbolt 26 rotates about a forkbolt pivot point 34 (e.g., pin) in the frameplate 14 between a primary latched position (FIG. 5A), a secondary latched position (FIGS. 3A and 4A), and a fully released position (FIGS. 1A, 2A, and 6). In the illustrated embodiment, the forkbolt 26 is biased (e.g., with a torsion spring or other biasing element) to rotate clockwise about the forkbolt pivot point 34 as viewed in FIGS. 1A, 2A, 3A, 4A, 5A, and 6 and toward the fully released position, although other embodiments include different rotational directions or movement of the forkbolt 26, as well as different biasing elements to bias the forkbolt 26.

With continued reference to FIGS. 1-6, the cinching latch assembly 10 further includes a detent (i.e., pawl) 38 disposed at least partially within the frameplate 14. The detent 38 rotates about a detent pivot point 42 (e.g., pin) in the frameplate 14. In the illustrated embodiment, the detent 38 is biased (e.g., with a torsion spring or other biasing element) to rotate counterclockwise about the detent pivot point 42 as viewed in FIGS. 1A, 2A, 3A, 4A, 5A, and 6, although other embodiments include different rotational directions or movement of the detent 38, as well as different biasing elements to bias the detent 38.

With continued reference to FIGS. 1-6, the cinching latch assembly 10 further includes a lift lever 46. The lift lever 46 includes a first end 50, a second opposite end 54, and a lift lever pivot point 58 disposed between the first end 50 and the second end 54. In some embodiments the lift lever pivot point 58 is the same as the forkbolt pivot point 34. The lift lever 46 is biased to rotate about the pivot point 58 via a biasing element 60 (e.g., spring as seen in FIG. 1B) such that the first end 50 is biased upwards toward the fishmouth 18 and the striker 22. The lift lever 46 further includes a lift lever pin 62 disposed either at the second end 54 of the lift lever 46, or between the pivot point 58 and the second end 54. In some embodiments, the lift lever pin 62 extends into or slides within a slot or opening within the frameplate 14. In the illustrated embodiment, the lift lever 46 is biased to rotate counterclockwise about the pivot point 58 as viewed in FIGS. 1B, 2B, 3B, 4B, and 5B, although other embodiments include different rotational directions or movement of the lift lever 46, as well as different biasing elements to bias the lift lever 46.

With reference to FIGS. 1-6, the cinching latch assembly 10 further includes an actuator lever 66 pivotally coupled to the frameplate 14 at a pivot point 70. The actuator lever 66 is coupled to an actuation element 72 (e.g., cable, drive motor, etc., seen in FIG. 2A). When the actuation element 72 is activated (e.g., via a motor or other drive mechanism), the actuator lever 66 is rotated (e.g., clockwise as viewed in FIGS. 1A, 2A, 3A, 4A, 5A, and 6). In the illustrated embodiment, the actuator lever 66 includes a first arm 74 configured to be pulled by the actuation element 72, and a second arm 78 spaced away from the first arm 74. The actuator lever 66 may be biased, for example via a spring or other biasing mechanism in a rotational direction (e.g., counterclockwise as viewed in FIGS. 1A, 2A, 3A, 4A, 5A, and 6).

The cinching latch assembly 10 further includes a cinch lever 82 coupled to the actuator lever 66. The cinch lever 82 rotates with the actuator lever 66. In some embodiments the cinch lever 82 is fixed to the actuator lever 66 (e.g., with a fastener or via a weld). In other embodiments the cinch lever 82 is integrally formed as a single piece with the actuator lever 66. As illustrated in FIGS. 1A, 2A, 3A, 4A, 5A, and 6, the cinch lever 82 includes an outer surface (e.g., curved surface or cam surface) that is configured to engage the lift lever pin 62 when the cinch lever 82 rotates, at least during a portion of the rotation of the cinch lever 82.

With continued reference to FIGS. 1-6, the cinching latch assembly 10 further includes a forkbolt cinching arm 90 that extends from the forkbolt 26 and is engaged by the second arm 78 during at least a portion of the rotation of the cinch lever 82. The forkbolt cinching arm 90 rotates with the forkbolt 26. In the illustrated embodiment the forkbolt cinching arm 90 is integrally formed as part of the forkbolt 26, although in other embodiments the forkbolt cinching arm 90 may be fixed (e.g., via a fastener or via a weld) to the forkbolt 26.

With reference to FIGS. 1-6, the cinching latch assembly 10 is arranged to receive and cinch/latch the striker 22 when it is desired to close a compartment, as well as to release the striker 22 when it is desired to open the compartment.

Figure 1B:
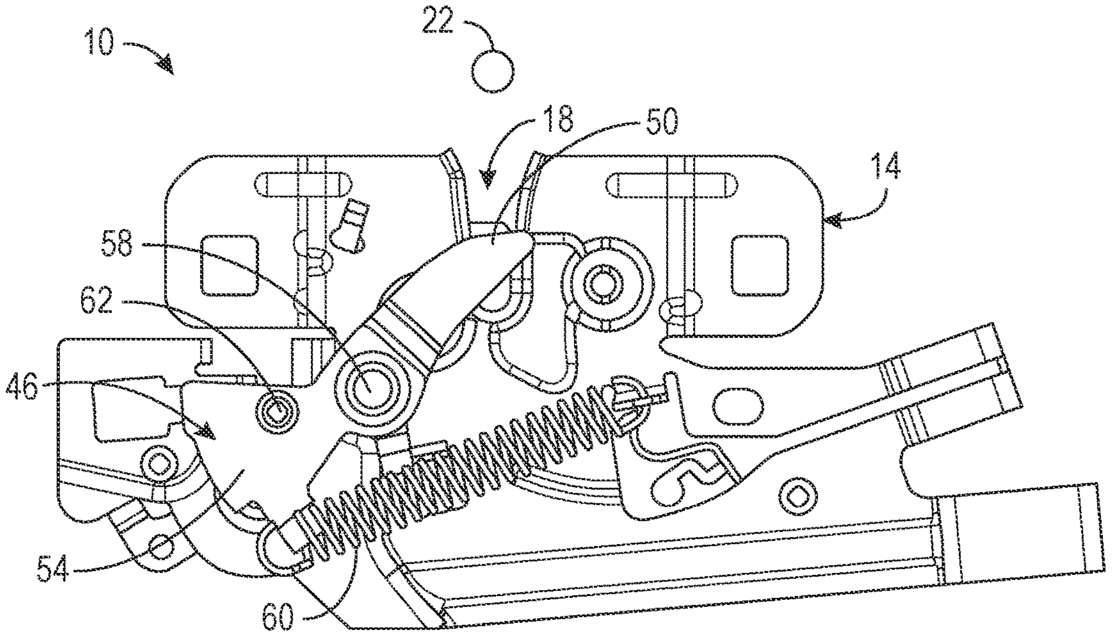

With reference to FIGS. 1A and 1B, prior to a cinching/latching operation the striker 22 may initially be located well above the frameplate 14 and the fishmouth 18 (e.g., if the compartment is opened). As illustrated in FIG. 1B, in this position (i.e., a "pop-up position") the lift lever 46 is biased upwardly. In some embodiments, in this position the first end 50 of the lift lever 46 may be located 15 mm or more above a final, primary latched position (i.e., a position when the compartment is fully closed and latched). Other embodiments include different values and ranges (e.g., at least 10 mm, at least 12 mm, at least 20 mm, etc.).

The compartment and its striker 22 may be moved downward, either manually in a manual close operation, or via a power close operation. In a manual close operation, an individual pushes down on the compartment until the striker 22 contacts the lift lever 46. As the compartment is pushed down farther, the lift lever 46 remains engaged with the striker 22 underneath the striker 22, such that the lift lever 46 resists the downward movement and the compartment is not closed too quickly (e.g., causing pinching of fingers). The striker 22 is eventually pressed down manually farther, forcing the striker 22 to engage the forkbolt 26, and to cause the forkbolt 26 to rotate against the biasing force of its biasing member. This causes the forkbolt 26 to eventually reach a fully rotated and closed state, where the forkbolt 26 is engaged with the detent 38, and where the striker 22 is locked in place in its final, primary latched position (see FIGS. 5A and 5B).

In contrast, in a power close operation the lift lever 46 is first moved down and away from the striker 22 before the striker 22 is itself moved down toward the fishmouth 18 and the forkbolt 26. With this movement, the compartment cover (e.g., a deck lid, hood, frunk lid, or other compartment cover) and the connected striker 22 may be powered down without having to overcome the biasing force of the lift lever 46. In the illustrated embodiment, and with reference to FIG. 2A, the cinching latch assembly 10 includes a controller 94 that is coupled to the actuation element 72. In some embodiments, the controller 94 is also coupled to one or more sensors 98 that detect a position of the striker 22 or lift lever 46 or compartment. For example, the sensors 98 may detect that the striker 22 and/or lift lever 46 are in the full, pop-up position. In some embodiments, the lift lever 46 may physically contact the sensor 98 (see for example the sensor 98 in FIG. 2B).

Figure 2B:
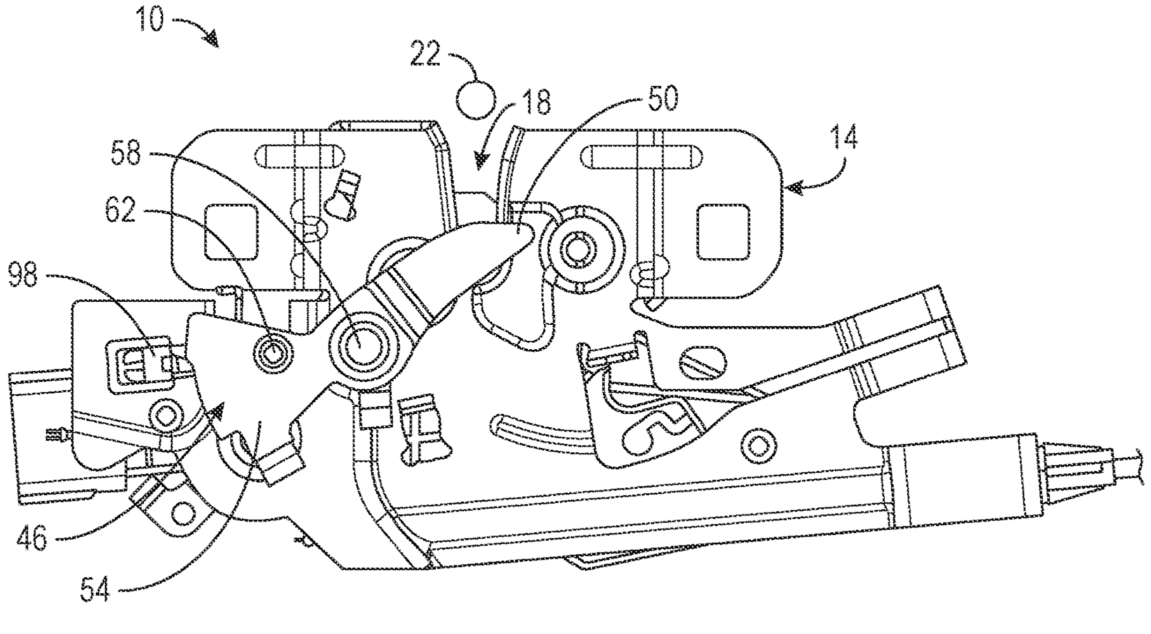

With reference to FIGS. 2A and 2B, when the controller 94 determines that the striker 22 is in the pop-up position, or when the controller 94 is otherwise informed that a power close operation should commence (e.g., via a command from inside the vehicle), the controller 94 activates the actuation element 72. The actuation element 72 pulls on the first arm 74 and rotates the actuator lever 66 (clockwise as viewed in FIG. 2A). Rotation of the actuator lever 66 also rotates the cinch lever 82, until the outer surface of the cinch lever 82 reaches the lift lever pin 62 and drives the lift lever pin 62 upwardly. Upward movement of the lift lever pin 62 rotates the lift lever 46, such that the first end 50 of the lift lever 46 is moved downward and away from the striker 22. Note for example the difference in position of the lift lever 46 in FIG. 2B as compared to FIG. 1B. In the position in FIG. 2B, the first end of the lift lever 46 has been pulled all the way down to approximately 10 mm above the primary latched position. Other embodiments include different distances or ranges of distances (e.g., between 5 mm-10 mm, between 5 mm and 15 mm, etc.).

Figure 3A:
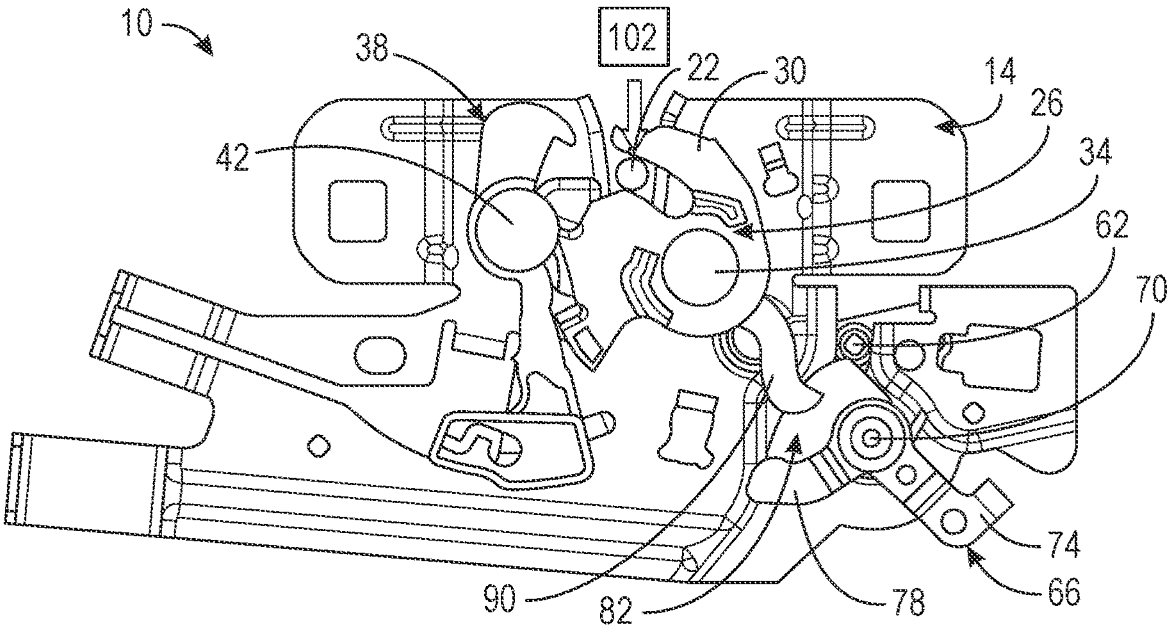
FIGS. 3A and 3B are front and rear views, respectively, of the cinching latch assembly, illustrating movement of a striker into a fishmouth and movement of a forkbolt into a secondary latched position after the end of the lift lever has been lowered.

With the lift lever 46 moved away from the striker 22, a drive unit 102 (illustrated schematically in FIG. 3A) then drives the compartment and its striker 22 downwardly until the striker 22 engages the forkbolt 26 and rotates the forkbolt 26. This movement causes the hook portion 30 to rotate over the striker 22 until the striker 22 is in a partially opened, secondary latched position. As noted above, this movement takes place without the added strain of overcoming the biasing force of the lift lever 46, since the first end 50 of the lift lever 46 has been moved down below the secondary latched position. Thus, the drive unit 102 is not as strained as it would be if the lift lever 46 were applying its biasing force to the striker 22 as the striker 22 was moved down into the secondary latched position. As illustrated in FIG. 3A, when the striker 22 is moved into the secondary latched position, the first end 50 of the lift lever 46 is spaced below the striker 22 (e.g., by at least 2 mm, at least 3 mm, or other values and ranges).

Figure 3B:
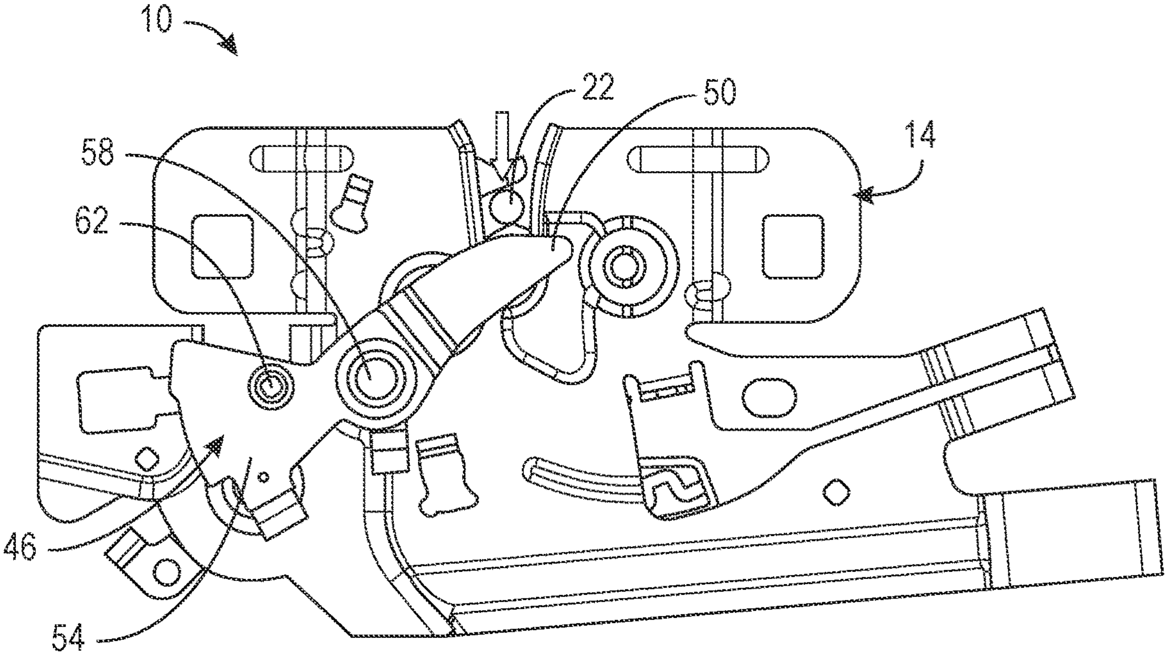

With continued references to FIGS. 3A and 3B, the sensor or sensors 98 may detect that the striker 22 and the forkbolt 26 are in the secondary latched position. For example, the striker 22 and/or forkbolt 26 may physically contact a sensor 98. In the illustrated embodiment, the striker 22 is approximately 12 mm above its final primary latched position when it is in the secondary latched position.

Figure 4A:
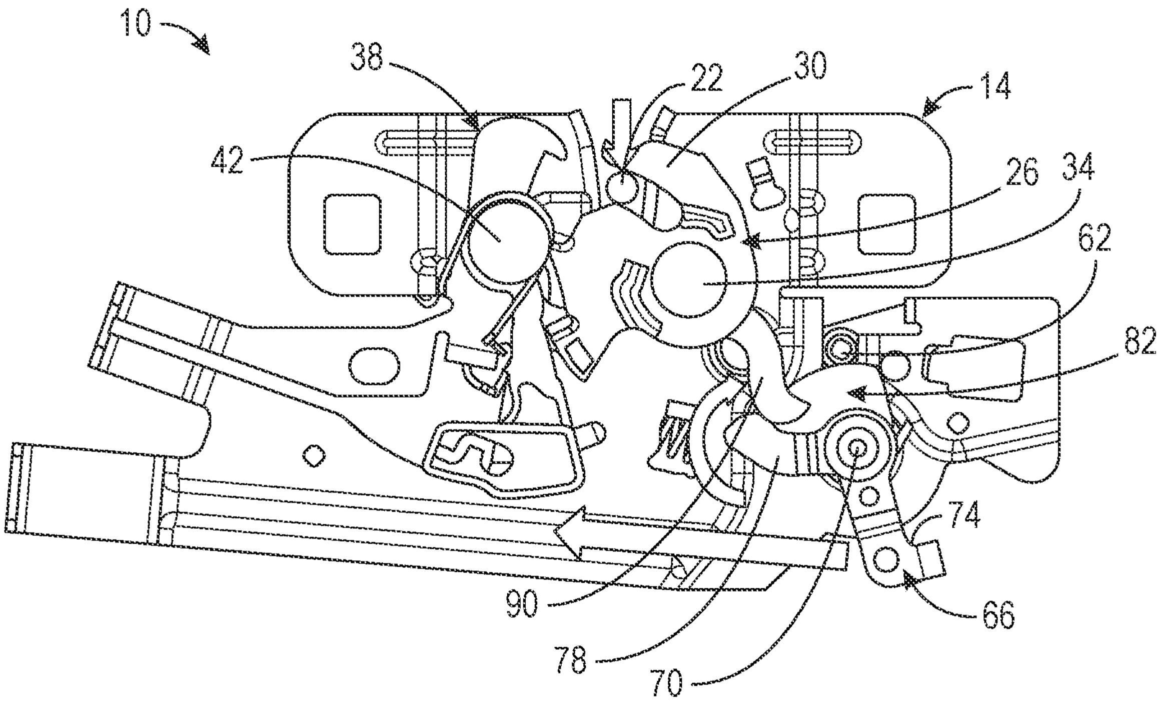
FIGS. 4A and 4B are front and rear views, respectively, of the cinching latch assembly, illustrating rotation of an actuator element into engagement with the forkbolt to drive rotation of the forkbolt and pull the striker down farther.
Figure 4B:
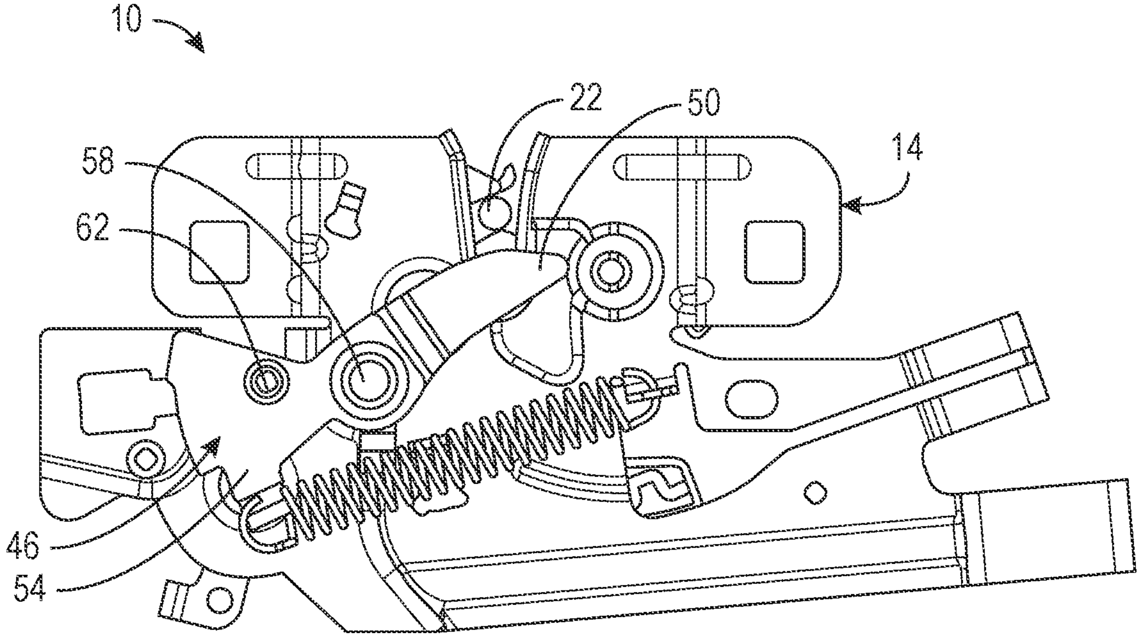

With reference to FIGS. 4A and 4B, when the controller 94 (which is in communication with the sensor or sensors 98) determines that the striker 22 is in the secondary latched position, the controller 94 then activates the actuator lever 66 again, causing the actuator lever 66 and the associated cinch lever 82 to rotate further, until the second arm 78 of the actuator lever 66 engages the forkbolt cinching arm 90 and rotates the forkbolt cinching arm 90 (counterclockwise as viewed in FIG. 4A). This movement forces the hook portion 30 of the forkbolt 26 to rotate down and pulls the striker 22 down. As the striker 22 is pulled down, the striker 22 then eventually engages the lift lever 46, rotating the first end 50 of the lift lever down along with the striker 22. This causes the lift lever pin 62 to separate from the outer surface of the cinch lever 82.

Figure 5A:
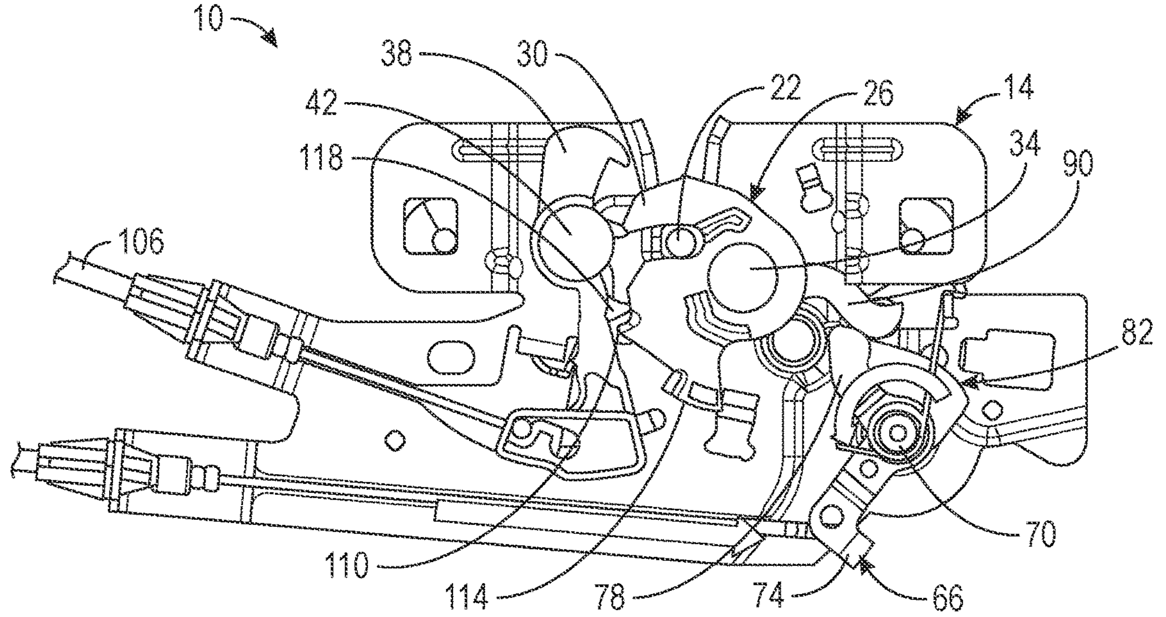
FIGS. 5A and 5B are front and rear review, respectively, of the cinching latch assembly, illustrating the forkbolt and cinching latch assembly overall in a primary latched position.
Figure 5B:
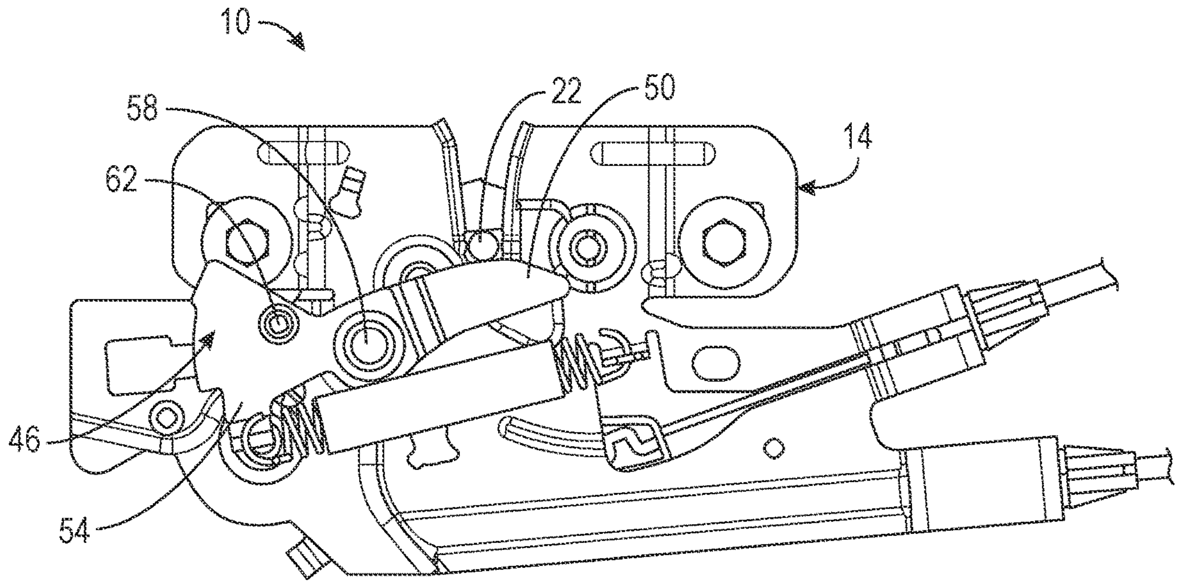
Figure 6:
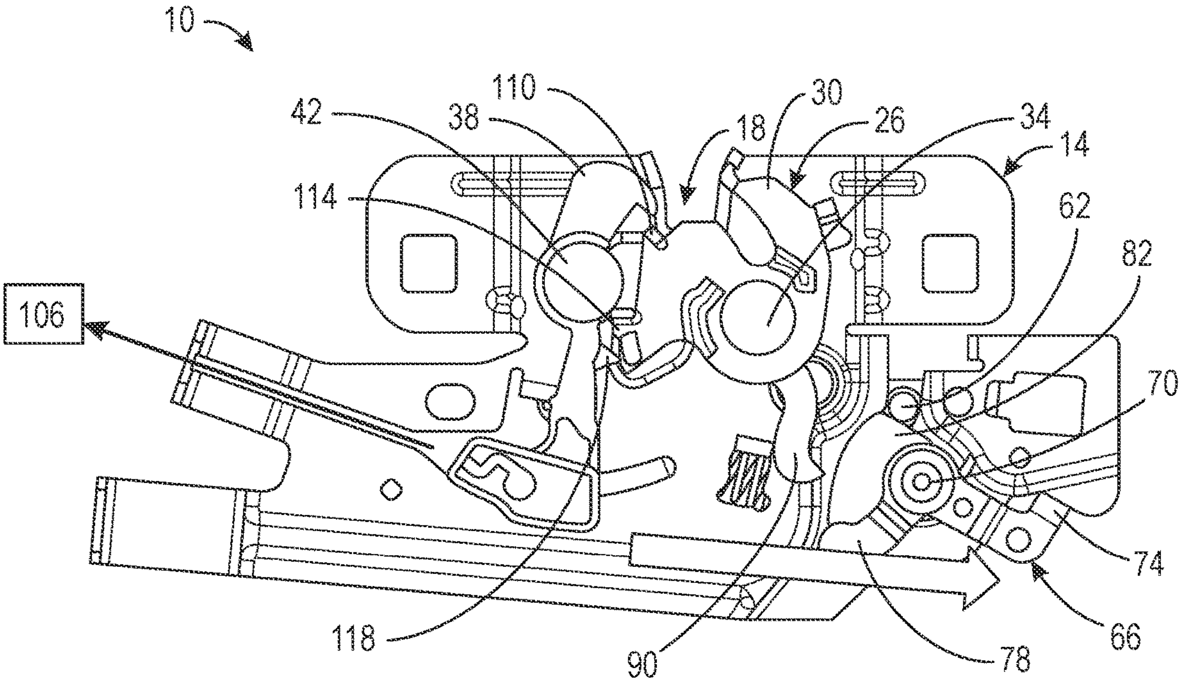
FIG. 6 is a front view of the cinching latch assembly, illustrating an actuation of the cinching latch assembly to release the striker and move back to the fully released position of FIGS. 1A and 1B.

With reference to FIGS. 5A, 5B, and 6 the continued rotation of the forkbolt 26 continues until the forkbolt 26 and the striker 22 are in the primary latched position, and where the first end 50 of the lift lever 46 is positioned directly underneath the striker 22 and presses up on the striker 22. In some embodiments, this inhibits or prevents the striker 22 from rattling. Additionally, and as illustrated in FIG. 6, in this position the actuation element 72 may be released, allowing the actuator lever 66 to freely rotate (e.g., counterclockwise as seen in FIG. 6) back to a starting position.

As described above, the cinching latch assembly 10 is also arranged to release the striker 22 when it is desired to open the compartment. For example, when the striker 22 is in the primary latched position as illustrated in FIGS. 5A and 5B, a driver of a vehicle may wish to open the compartment. For this purpose, and as illustrated in FIGS. 5A and 6, the cinching latch assembly 10 includes a release mechanism 106 (e.g., a pull cable) that may be pulled to rotate the detent 38.

With reference to FIGS. 5A and 6, the forkbolt 26 and the detent 38 may each have least one protrusion, ledge, or other structure that engages with a corresponding structure on the other of the forkbolt 26 or detent 38 to control rotational movement of the forkbolt 26 and the detent 38 during the release operation. In the illustrated embodiment, the forkbolt 26 includes a first ledge 110 and a second ledge 114, and the detent 38 includes a protrusion 118. When the release mechanism 106 is activated a first time (e.g., when the cable is pulled), the detent 38 is rotated against the biasing force of its biasing member to move the protrusion 118 off of the first ledge 110, and the forkbolt 26 is able to rotate freely until a stop (e.g., an end of the detent 38 or separate protrusion on the detent 38) stops the rotation. When the release mechanism 106 is released, the protrusion 118 on the detent 38 then engages the second ledge 114 of the forkbolt 26. In this position, the striker 22 has moved up via the lift lever 46 and is pressed against a bottom of the hook portion 30 of the forkbolt 26. When the release mechanism 106 is activated a second time, the protrusion 118 is pulled off of the second ledge 114, allowing the forkbolt 26 to rotate freely to the fully released position, and allowing the striker 22 to completely lift up and away from the frameplate 14. In other embodiments the release mechanism 106 may only need to be pulled once, or may need to be pulled more than twice, to fully release the striker 22. For example, the forkbolt 26 and/or detent 38 may include other numbers of protrusions, ledges, etc. to cause a desired movement of the striker 22 and a desired number of pulls of the release mechanism before the striker 22 is fully released.

Although various embodiments have been described in detail with reference to certain examples illustrated in the drawings, variations and modifications exist within the scope and spirit of one or more independent aspects described and illustrated.

What is claimed is:

1. A cinching latch assembly for latching a striker, the cinching latch assembly comprising:

a forkbolt biased to rotate about a first pivot point between a primary latched position, a secondary latched position, and a fully released position, wherein the forkbolt includes a hook portion, wherein the secondary latched position is rotationally between the primary latched position and the fully released position, such that the forkbolt is configured to move from the fully released position, in which the striker is positioned above the hook portion of the forkbolt, to the secondary latched position, in which the striker is positioned underneath the hook portion of the forkbolt, and then to the primary latched position during a powered cinching operation;

a detent biased to rotate about a second pivot point, the detent configured to engage with the forkbolt in at least one of the primary latched position and the secondary latched position of the forkbolt;

a lift lever biased to rotate about a third pivot point, the lift lever having a first end configured to lift up on the striker during at least one position of the striker within the cinching latch assembly; and a cinch lever configured, during the powered cinching operation, to lower the lift lever away from the striker prior to the forkbolt moving to the secondary latched position from the fully released position, such that striker remains spaced from and positioned above the lift lever at all times as the striker moves to the secondary latched position from the fully released position.

2. The cinching latch assembly of claim 1, wherein the third pivot point is the same as the first pivot point.

3. The cinching latch assembly of claim 1, further comprising an actuator lever, wherein the cinch lever is coupled to the actuator lever, and wherein the actuator lever is configured to pivot about a fourth pivot point.

4. The cinching latch assembly of claim 3, wherein the fourth pivot point is different than the first pivot point, the second pivot point, and the third pivot point.

5. The cinching latch assembly of claim 3, further comprising a frameplate, wherein the actuator lever is pivotally coupled to the frameplate about the fourth pivot point.

6. The cinching latch assembly of claim 3, further comprising an actuation element, wherein the actuator lever is coupled to the actuation element, such that when the actuation element is activated, the actuator lever is configured to be pivoted.

7. The cinching latch assembly of claim 6, wherein the actuator lever includes a first arm configured to be pulled by the actuation element, and a second arm spaced away from the first arm.

8. The cinching latch assembly of claim 7, further comprising a forkbolt cinching arm extending from the forkbolt, wherein the forkbolt cinching arm is configured to be engaged and rotated by the second arm during a rotation of the cinch lever during the powered cinching operation.

9. The cinching latch assembly of claim 1, wherein the lift lever includes a lift lever pin, wherein the cinch lever includes an outer surface configured to engage the lift lever pin during rotation of the cinch lever during the powered cinching operation.

10. The cinching latch assembly of claim 1, wherein the cinch lever is configured to lower the lift lever, such that when the forkbolt is in the secondary latched position, the lift lever is spaced from the striker.

11. A cinching latch assembly for latching a striker, the cinching latch assembly comprising:

a forkbolt biased to rotate between a primary latched position, a secondary latched position, and a fully released position; and a lift lever having a first end configured to lift up on the striker during at least one position of the striker within the latch assembly, the lift lever additionally having a second, opposite end, and a pivot point disposed between the first end and the second end;

wherein the first end of the lift lever is configured to be raised such that the striker is pressed upwardly by the first end of the lift lever at a location above a location of the striker in the secondary latched position of the forkbolt;

wherein the pivot point is a first pivot point, wherein the forkbolt is also biased to rotate about the first pivot point, wherein the cinching latch assembly further includes a detent biased to rotate about a second pivot point, the detent configured to engage with the forkbolt in at least one of the primary latched position and the secondary latched position of the forkbolt.

12. The cinching latch assembly of claim 11, wherein the forkbolt includes a hook portion, and wherein the striker is configured to be held by the hook portion in the secondary latched position of the forkbolt.

13. The cinching latch assembly of claim 11, further comprising a cinch lever configured, during a powered cinching operation, to lower the first end of the lift lever away from the striker prior to the forkbolt moving from the fully released position to the secondary latched position.

14. The cinching latch assembly of claim 13, further comprising an actuator lever, wherein the cinch lever is coupled to the actuator lever.

15. The cinching latch assembly of claim 13, wherein the second end of the lift lever includes a lift lever pin, wherein the cinch lever is configured to engage and lift the lift lever pin during a rotation of the cinch lever during the powered cinching operation.

16. The cinching latch assembly of claim 13, further comprising a forkbolt cinching arm extending from the forkbolt, wherein the forkbolt cinching arm is configured to be engaged and rotated during a rotation of the cinch lever during a rotation of the cinch lever.

17. The cinching latch assembly of claim 11, further comprising a cinch lever biased to rotate about a third pivot different than the first and second pivot points.

18. A method of operating a cinching latch assembly, the cinching latch assembly having a forkbolt biased to rotate between a primary latched position, a secondary latched position, and a fully released position, wherein the secondary latched position is rotationally between the primary latched position and the fully released position, wherein the forkbolt includes a hook portion, wherein the method comprising:

moving the forkbolt from the fully released position, in which a striker is positioned above and spaced from the hook portion of the forkbolt, to the secondary latched position, in which the striker is positioned underneath the hook portion of the forkbolt, and then to the primary latched position;

rotating a cinch lever until a surface of the cinch lever contacts a latch lever pin on a second end of a lift lever, wherein the lift lever is configured to pivot about a pivot point; and rotating the cinch lever further such that the latch lever pin is raised, forcing the lift lever to rotate about the pivot point, and forcing a first end of the lift lever to be lowered away from a striker prior to the forkbolt moving to the secondary latched position from the fully released position, such that striker remains spaced from and positioned above the lift lever at all times as the striker moves to the secondary latched position from the fully released position.

19. The method of claim 18, wherein the first end of the lift lever is spaced from the striker when the forkbolt is in the secondary latched position.

* * * * *